United States Patent

[11] 3,627,303

| [72] | Inventor | Abraham Zeewy<br>University Heights, Ohio |
|---|---|---|
| [21] | Appl. No. | 822,490 |
| [22] | Filed | May 7, 1969 |
| [45] | Patented | Dec. 14, 1971 |
| [73] | Assignee | Harris-Intertype Corporation<br>Cleveland, Ohio |

[54] MACHINE CONTROL CIRCUIT
18 Claims, 7 Drawing Figs.

[52] U.S. Cl. .................................................. 270/56, 271/57
[51] Int. Cl. ....................................................... B65h 43/02
[50] Field of Search ............................................ 270/54–56; 271/57; 198/133

[56] References Cited
UNITED STATES PATENTS

| 3,191,925 | 6/1965 | McCain et al. ............... | 270/56 |
| 3,287,015 | 11/1966 | Preuss et al. .................. | 271/57 |
| 3,317,026 | 5/1967 | Zugel et al. ................... | 198/133 |
| 3,443,807 | 5/1969 | Zugel ............................ | 271/57 |

Primary Examiner—Robert W. Michell
Assistant Examiner—L. R. Oremland
Attorney—Yount and Tarolli ABSTRACT: Signature-handling machine in which thickness of signature book is sensed by a detector wheel. Detector wheel operates switch whose output is integrated to provide signal for indicating a book of incorrect or correct thickness. Incorrect thickness signal operates with delay to prevent stitching and to effect a rejection of the signature book. Delay for rejection is introduced by a shift register which is shifted by a clock pulse derived from a switch through circuitry which prevents false clock pulses.

PATENTED DEC 14 1971

INVENTOR.
ABRAHAM ZEEWY
BY
Yount and Tarolli
ATTORNEYS

MACHINE CONTROL CIRCUIT

During the operation of various types of machines, for example signature collating and stitching machines, it is desirable to sense the existence or absence of a condition and to indicate this by closing or opening a limit switch. In the case of a signature collating and stitching machine, it is desirable to sense the thickness of a pack, or book, of signatures to determine whether or not the pack has the proper number of sheets. This is often done by rotating a wheel in engagement with the pack as it is carried by a sensing station and causing the wheel to rock toward or away from the signatures in response to the thickness of the pack. This means that the wheel, if it is to detect a change in thickness of a single sheet, must cause a sensing limit switch to operate between open and closed conditions in response to a change in thickness due to a single sheet in the signature pack.

In such a system, it is difficult to obtain a positive opening and closing of the switch in response to a small change in condition and accordingly, the contacts may bounce between open and closed conditions when attempting to indicate either condition. Such stuttering of the contacts will give an indecisive signal or often a false signal. While it is desirable that the limit switch be sensitive to small changes, it is also necessary that the signal from the limit switch be decisive for a given condition. In addition, control circuits for machines, such as signature collators and stitchers, often require the sensing of a condition at one point in the machine cycle and the performance of a control operation in response to the existence of a sensed condition is at a subsequent cycle. One way of obtaining the delay is to use a shift register in which a signal indicative of the condition is stored and shifted periodically as the machine operates in response to a shift signal to introduce the proper delay. Advantageously, the shift signal is derived by the closing of a switch in response to relative movement between parts of the machine. However, problems are often encountered in such a system because of false signals which occur due to bouncing of the switch contacts, etc. False signals will introduce a false shift in the register and consequently the shift register will not operate properly to shift the information with the proper delay.

Accordingly, the present invention contemplates the provision of a new and improved machine control circuit, particularly a control circuit for a signature collator and stitcher, in which a switch is open or closed to indicate the existence or absence of a particular condition with the switch being sensitive to small changes in the condition and the control circuitry being such that the signal from the switch is decisive even though the switch contacts stutter while sensing the condition.

Moreover, the present invention contemplates the provision of a new and improved machine in which a control signal is stored in a shift register and shifted through the register in response to timing signals derived from a switch, which is closed at a particular time in the machine cycle by the movement of a part of the machine so that the stored condition is shifted to a subsequent stage of the shift register each time the switch is operated, the circuit being such that bouncing of the switch does not effect a false shifting of the register.

The present invention contemplates a new and improved control circuit for a signature collating and stitching mechanism in which a detector operates a limit switch to indicate a good pack or a bad pack insofar as the proper number of sheets is concerned and this information is stored in a shift register to introduce a time delay in the event of a bad pack until the pack reaches a reject location and is shifted in response to the operation of a timing switch which is effective when actuated during a predetermined portion of each cycle of the machine to shift the information in the register, the control circuitry being such that a bouncing of the timing switch, after giving a shift signal, will not effect an erroneous shift of information, even though the bouncing occurs during said predetermined portion of the cycle.

The present invention further contemplates the provision of a new and improved machine in which a switch is operated between open and closed positions to indicate the existence or absence of a condition with the circuit being such that stuttering of the contacts while the switch is attempting to signal an open or closed condition does not result in an indecisive or false signal which effects an undesired control operation.

Further objects and advantages of the present invention will be apparent from the following detailed description thereof made in accordance with the accompanying drawings forming a part of this specification for all matter disclosed therein and in which.

The present invention is shown as embodied in a control for a signature-handling machine of the type shown and described in U.S. Letters Pat. No. 3,317,026 to V. A. Zugel et al., issued May 2, 1967.

Figure 1:
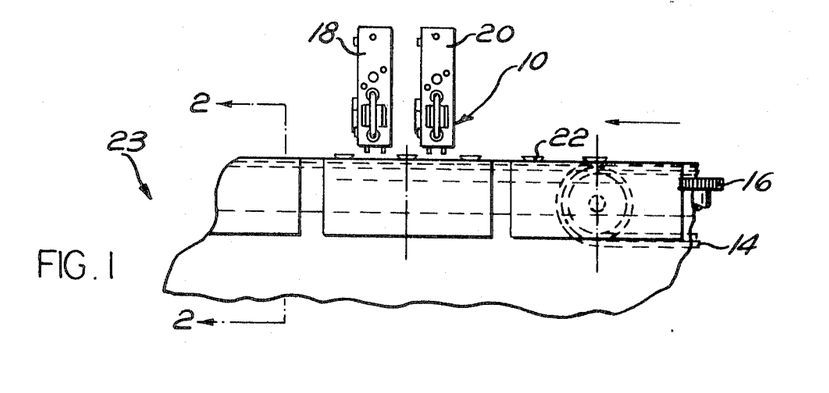
FIG. 1 is a fragmentary view of a signature-handling mechanism embodying the present invention.
Figure 2:
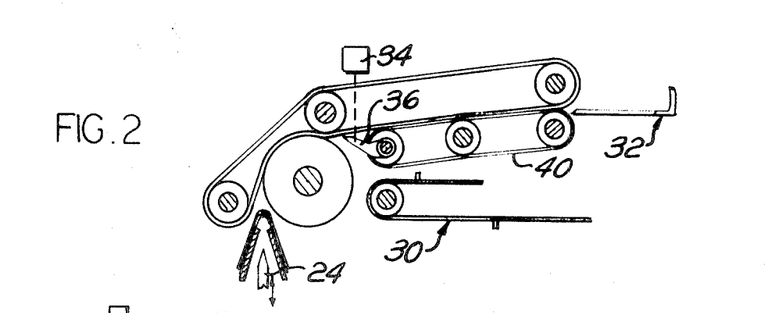
FIG. 2 is a schematic view of a portion of the machine looking approximately from along line 2—2 of FIG. 1.

FIG. 1 fragmentarily illustrates the machine shown in that patent. The machine includes a stitching station 10 for stitching signatures moving to the stitching section from a collating section, not shown. The signatures are moved along a saddle and pushers mounted on a chain 14 move the signatures through and out of the collating section. As the signatures leave the collating sections, the thickness of each pack of signatures is sensed by a detector wheel 16.

The signatures are conveyed from the chain 14 to a pair of stitching heads 18, 20 at the stitching section by a reciprocating shuttle mechanism having fingers 22 which are adapted to engage and clamp the signatures against the saddle as they move from the chain conveyor 14 to transport the signatures to a position underneath the stitching heads 18, 20 as described in the aforesaid patent. The shuttle mechanism is reciprocated once each cycle. The stitching heads are operated one each cycle and the signatures after stitching, are moved from underneath the stitching head to a delivery station 23 by the operation of the reciprocating shuttle mechanism. As the shuttle mechanism moves a signature from the conveyor to the stitching station, it moves the previously stitched signature to the delivery station. At the delivery station, the signature is moved upwardly by a vertically reciprocating pusher member 24 which moves the signature into the nip of a delivery belt 26 and a cooperating roll 28 to move the signature onto a delivery conveyor 30.

As explained in the aforesaid patent, the shuttle mechanism is adjustable to have a long stroke or short stroke. The short stroke is used with short signatures so that the short signature is not moved directly from the stitching station to the delivery station but is first moved to an intermediate station and then to the delivery station. Consequently, while two machines cycles are required to move a long signature from the collator delivery station to the stitcher and then to the delivery station, three cycles are required for a short signature.

If the signature book is a bad book, it may be shunted to a hopper 32 by operating a solenoid 34 to rock interceptor fingers 36, only one of which is shown, into an intercepting position to intercept the signature as it moves from beneath the belt 26 and the roll 28. A signature book intercepted by the fingers 36 continues with the belt 26 over the top of a belt 40 to the hopper 32.

In the machine disclosed in the aforesaid U.S. Pat. NO. 3,317,026, the signature pack may be of two different lengths. When the machine is set to collate long signatures, e.g. 28 inch, at least 28 inches of chain must move by each collating station for each signature dropped at the station, one is dropped each machine cycle. The detector wheel has a circumference such that the circumference moves at conveyor speed when the detector makes two revolution per machine cycle.

If the short signatures are approximately one-half the length of the long signatures, e.g. 14 inches, the chain conveyor speed can be cut in half so that movement of the chain conveyor 14 will be one-half that for a long signature during a machine cycle so that the signature feeding mechanism will drop two short signatures onto the length of the chain normally allotted for one long signature. Under these conditions the detector wheel makes one revolution for each machine cycle since it is driven at the same angular speed as the conveyor 14.

Figure 3:
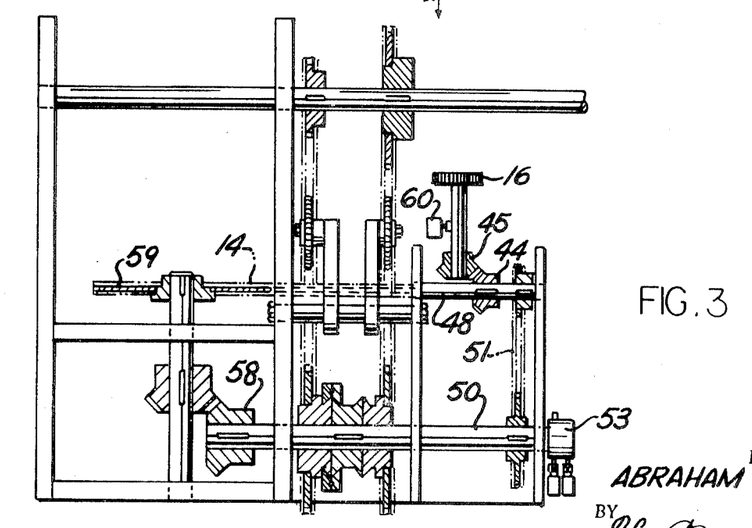
FIG. 3 is a sectional view of a portion of the drive mechanism for the machine of FIG. 1.

The detector wheel 16 is best shown in FIG. 3 and, as shown therein, comprises a wheel which is on the shaft driven by a bevel gear 44 which meshes with a bevel gear 45 on the detector wheel shaft so that the detector wheel and its shaft can rock about the axis of the gear 44 while detectng a signature. The bevel gear 44 is mounted on a shaft 48 which is rotated for a shaft 50 by a chain drive 51 so that the wheel makes two revolutions for each revolution of shaft 50. The shaft 50 has a cam wheel 53 thereon adapted to operate timing switches 56, 57 to indicate machine cycles. The shaft 50 drives the chain conveyor 14 through bevel gears 58 and a sprocket 59 and is driven in timed relationship to the other machine mechanism, as described in more detail in the aforesaid patent. Suffice it to say, the drive to the shaft 50 is such that it is driven either one or one-half revolution for each machine cycle, depending on whether the machine is set for long or short signatures, and that the detector wheel is driven to revolutions for each revolution of the shaft 50 by the chain drive 51.

As a signature pack passes under the detector wheel 16, the detector wheel will be moved from a normal position or proper pack thickness either in a direction away from the signature or toward the signature of the pack and has a greater or lesser number of sheets than the number corresponding to the normal position of the detector wheel. When the detector wheel moves in one direction away from its normal position, it operates a detector switch 60. This switch is shown schematically in FIG. 3.

When the detector wheel 16 detects a bad signature book, the stitcher solenoid is to be disabled for the immediately following cycle since the signature book, whether long or short, will then be at the stitching heads. Additionally, the solenoid 34 is to be actuated two or three cycles after the detection cycle, depending on whether the signature is long or short, to reject the bad book. The energization of the solenoid 34 effects a rejection of the signature book and the delivery of the signature to the bad book hopper 32.

Figure 4:
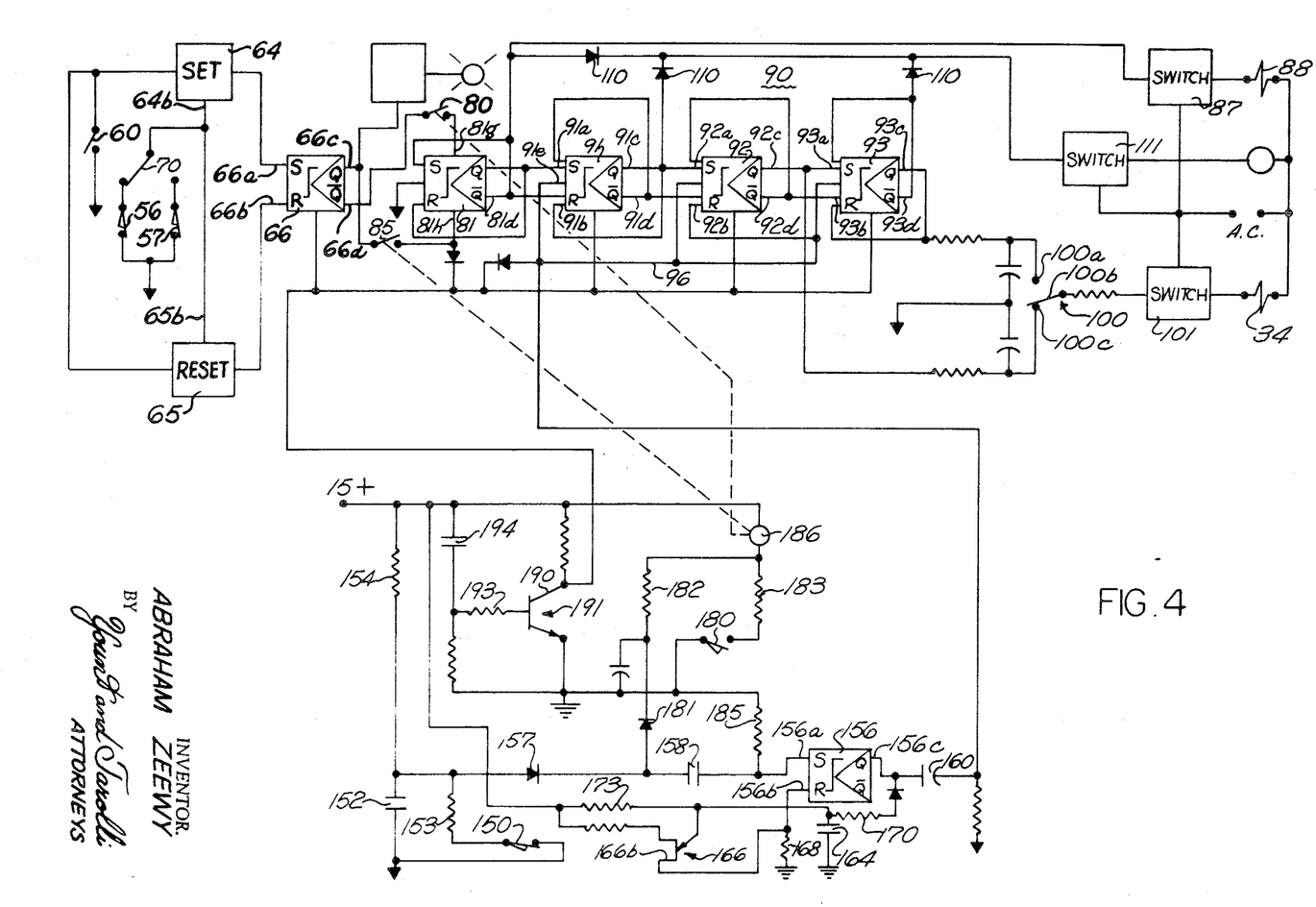
FIG. 4 is a diagram of a control circuit for the machine of FIG. 1 which embodies the present invention.

FIG. 4 illustrates a control circuit embodying the present invention to effect the necessary control of the stitcher solenoids and the reject solenoids in response to the sensing of a bad pack of signatures.

The detector switch 60 controls the signals applied to set and reset circuits 64, 65 respectively for a bistable memory circuit 66. The set and reset circuits are conditioned to respond to the detector switch 60 if either of the timing switches 56, 57 is open. When the detector switch 60 is open, indicating a good signature book, the set circuit is ineffective to apply a 1 signal to the set terminal 66a of the bistable memory circuit 66 and the reset circuit is effective to apply a 1 signal to the reset input 66b of the memory circuit 66. When the detector switch 60 is closed, the signal set circuit 64 applies a set signal to the set terminal 66a of the bistable memory circuit 66 and the reset circuit applies a 0 signal to the reset terminal 66b. The bistable memory circuit has an output 66c on which a 1 output occurs when the storage circuit is set in its Q-state and an output 66d upon which a 1 signal appears when the storage circuit is in its reset or $\overline{Q}$-condition. When a 1 is present on the output 66c, and 0 is present on the output 66d and vice versa.

From the foregoing, it can be seen tat the bistable storage circuit is set to a Q- or $\overline{Q}$-condition depending upon whether or not the switch 60 is closed or open during a given cycle. The sensing of the thickness of the signature pack is limited to a portion of the machine cycle only. This is accomplished by inhibiting the set and reset circuits 64, 65 except during the desired sensing period. Referring to FIG. 4, each of the set and reset circuits 64, 65 have an inhibit terminal 64b and 65b respectively connected to the switch arm 70 of a selector switch 71. The switch arm 70 can be moved into engagement with either of two switch contacts which are connected to the timing switches 56, 57 respectively so that a signal will appear on the inhibit connections for the period during which the selected timing switch is closed. When either of the switches 56, 57 is closed, the circuits 64, 65 are inhibited against supplying set or reset signals to the input terminals 66a or 66b respectively of the bistable memory circuit 66. It is only during the time that there is no signal applied to the input terminals 64b, 65b that the set and reset circuits can operate to apply set or reset signals to the memory circuit 66. The switches 56, 57 are open during that portion of the cycle when the detector wheel 16 is to sense the thickness of the signature pack and set the memory circuit 66 to indicate whether the pack is acceptable or unacceptable. When the detector wheel senses a bad pack, the set circuit operates to set memory 66 so that a 1 appears on its Q-output 66c and a 0 on its $\overline{Q}$-output 66d. Conversely, when a good pack is sensed the reset circuit operates to reset the memory 66 to its $\overline{Q}$-condition with a 1 on its output 66d and a 0 on its output 66c. A 1 on the Q-output 66c of the memory circuit 66 indicates that the stitcher solenoid should be deenergized during the cycle immediately following the cycle during which the sensing of the bad pack occurred. This is because the signature is stitched in the immediately following cycle. Advantageously, the condition of memory circuit 66 effects the setting of a second bistable memory circuit 81 at the end of the sensing cycle. The memory circuit 66 has its $\overline{Q}$-output connected through a timing switch 80 to a direct set input for the memory circuit 81 to set the memory circuit 81 to its Q-state if there is a 0 output on the $\overline{Q}$-output 66d of memory circuit 66. It will be recalled that a 0 is present if the signature book sensed is a bad book. If the signature pack is a good pack, the memory circuit 66 will be in its $\overline{Q}$-state at the end of the cycle and the $\overline{Q}$-output thereof which is connected to the reset terminal of the memory circuit 81 will have a 1 thereon. The memory circuit 81 is of the type known as a JK flip-flop circuit and the direct set terminal 81g will not set the memory to its Q-state to store a 1 therein unless a 0 is applied to the input 81g. In the absence of a 0 input, as when a 1 is applied or when no input is applied as when the switch 80 is open, the input will not effect a setting of the circuit. Such circuits are commercially available an are such that the internal circuit of the memory will maintain a 1 input on the input 81g in the absence of a voltage indicating a 0 input. For example, a oinput may be 0.2 which causes a diode which would be back biased by a 1 signal of 13 v. to conduct and set the memory circuit. The Q-output 66c of the memory circuit is connected to a direct reset input 81h through timing switch contacts 85 which are operated at the end of the cycle as in the case of the contacts 80. The direct reset requires a 0 to be applied thereto to reset the circuit as in the case of the direct set input 81g.

It can now be seen that because of the connections between the memory circuit 66 and the memory circuit 81, the memory circuit 81 is set at the end of the cycle in its Q-state for a bad book and in its $\overline{Q}$-state for a good book.

The $\overline{Q}$-output terminal 81d of the memory circuit 81 is connected directly to a switching circuit 87 for controlling the energization of a stitcher solenoid 88. A switching circuit is effectively a 1 input OR circuit for controlling AC power and as long as an output is maintained on the $\overline{Q}$-terminal 81d, the circuit is effective to supply power to a stitcher solenoid which when energized operates to allow the stitcher to effect a stitching of the signature at the proper time in the cycle of the machine. If, however, the memory circuit 81 is in its Q-state, the loss of the 1 signal on terminal 81d and the establishment of a 1 on the output 81c will cause the stitcher circuit 87 to operate to remove the power from the stitcher solenoid so that the stitcher solenoid prevents the operation of the stitcher at its normal point in the cycle. The stitcher conventionally operates ahead of the last part of the cycle, for example, in advance of 220°.

During each cycle, for example 220°, the information stored in the memory circuit 81 is transferred to the first stage of a three-stage shift register 90 having stages 91, 92, 93. The memory stages 91, 92, 93 are each capable of assuming a Q or $\overline{Q}$-state and in the illustrated embodiment are the type of memory circuits where each state in the register is set to a Q or $\overline{Q}$-condition, depending on whether there is a signal on a set input terminal or on a reset input terminal when a clock pulse is applied to a clock terminal. For example, the memory stage 91 has a set terminal 91a, a reset terminal 91b, an output terminal 91c upon which a 1 appears indicating when the stage is set in its Q-state and an output terminal 91d upon which a 1 appears when the stage is set in its $\overline{Q}$-state. The memory circuit 91d also has a clock terminal 91e connected to a shift line 96. If an input signal is applied to the input terminal 91 a or the input 91b of the memory circuit 91, nothing will happen unless a clock signal or shift signal is applied to the input 91e. When this happens, the memory circuit 91 will Q- set to a Q or $\overline{Q}$-state depending upon whether there is an input signal or 91a or 91b. The memory circuit 91 has its Q-output 91c connected to the set input terminal 92a of the circuit 92 and its $\overline{Q}$-output 91d connected to the reset input 92b of the circuit 92 so that when shift signal is applied to the line 96, the stage 92 will be set in accordance with the signals on the output of the memory 90. Similarly, the Q- and $\overline{Q}$-signals on the output 92c and 92d of the stage 92 are connected to set and reset inputs 93a, 93b of the memory stage 93. The memory stage 93 has Q- and $\overline{Q}$-outputs 93c and 93d which indicate the Q- and $\overline{Q}$-stages of the memory circuit. Each stage has a clock terminal connected to the shift line 96.

Once during each machine cycle when the memory circuit 81 is set in accordance with the information from the preceding cycle, a shift pulse is applied to the shift line 96 to store the information in memory circuit 81 in the first stage of the shift register and to shift the information stored in the shift register one stage. Accordingly, three cycles are required to set the first stage of the shift register in accordance with memory 81 and to shift the setting to memory circuit 93 which is the last stage of the register.

The Q-output 93c of the memory stage 93 of the shift register is connected to a contact 100a of a selector switch 100 having a switch arm 100b and a second switch contact 100c. The switch arm 100b may be engaged with either the contact 100a or 100c. The switch arm 100b is connected to the input of a switching circuit 101. When an input is applied to the switch circuit 101, the switching circuit supplies power to the reject solenoid 34. Switching circuit 101 may be considered broadly as a one input OR circuit for applying AC power to the reject solenoid 34 when a 1 input is applied.

From the foregoing description, it will be seen that the reject signal occurs in the third cycle after the sensing of the bad book if the switch 100 is set to contact 100a, which is for short signatures, at the end of the cycle in which the bad book is sensed, the memory circuit 81 is set to a Q- or $\overline{Q}$-condition, it being set in a Q-condition if the book is bad and in a $\overline{Q}$-condition if the book is good. If the book is bad, the loss of a 1 signal on the $\overline{Q}$-ouput deenergizes the stitcher solenoid to prevent the stitcher from operating in the next cycle. On the immediately following cycle when the signature book is moved to the stitching station, the memory 91 will be set to a Q-condition if the book is bad and maintained in a $\overline{Q}$-condition if the book is good. For short signatures, on the next following cycle the signature is moved from the stitching station to an intermediate position and information stored in the memory 91 concerning the thickness of the book is transferred to the memory 92. On the next cycle in which a short signature book is to be pushed by the ejector member 24 to the delivery mechanism, the information as to the thickness of the book is shifted to the register 93 so that it will have a Q- or $\overline{Q}$-output depending upon the thickness of the book in the cycle the book is to be delivered. If the book is a bad book, the stage will have a $\overline{Q}$-output but if it is a book, the stage will have a Q-output and this will cause the switching circuit 101 to energize the reject solenoid 34 to cause the signature to be delivered to the reject hopper.

If the signatures being handled are 28 inch signatures, the selector switch 100 is set so that its switch arm 100b engages the contact 100c. The contact 100c is connected to the Q-output of the memory stage 92 of the shift register so that if the signatures are 28 inch signatures, the reject solenoid will be operated one cycle earlier. This is appropriate because when handling 28 inch signatures, the signature is moved from the stitching station and over the pusher arm in one cycle, as described above and in the aforesaid Zugel et al. patent.

In accordance with the present invention, the $\overline{Q}$-outputs of the memory stages 81, 91 and 93 are connected through diodes 110 to a switching circuit 111 which operates to maintain the main contactor for the machine energized. The diodes 110 constitute an OR gate and when the OR gate loses its output, power is lost to the main contactor and the machine cannot be operated. If three bad signature books are sensed in a sequence which sets these memory circuits to their Q-condition, there will be 0 outputs on the outputs 81d, 91d and 93d. In such a situation, the OR gate will lose its inputs and the machine will be stopped. It will be noted that this is also true for 28 inch signature books. While bad long signature books effect operation of the reject solenoid from the memory stage 92, the information from the memory stage 92 is shifted to the memory stage 93 of the shift register even though it does not actuate the reject solenoid. Consequently, the stage 93 will function the same way as it does in the case of 14 inch signatures.

One of the problems encountered in sensing the thickness of signature books is detecting the difference in thickness of a signature book due to a difference of one signature. When set to detect a missing or added signature, the detector switch 60 will often stutter during the detecting or sensing period. If the switch contacts open and close during the sensing period, it will give both a set and reset signal and if the system responds to or attempts to respond to both of these signals, indecisiveness necessarily results.

In accordance with the present invention, the signal from the detector switch 60 is integrated over a portion of the sensing period to determine whether the switch is signaling a good or bad signature book. If a signature book differs from a normal book, as by one signature, the switch 60 will be closed during the sensing period except as it may be opened due to vibration, or bouncing, or waviness of the signatures if the latter is present. Similarly, if the book is a good book, conditions may actually cause the contacts to bounce closed during the sensing period, even though the contacts are to be open throughout the period. To overcome such problems, the signal from the detector switch is integrated during the sensing period to provide a decisive signal.

Figure 5:
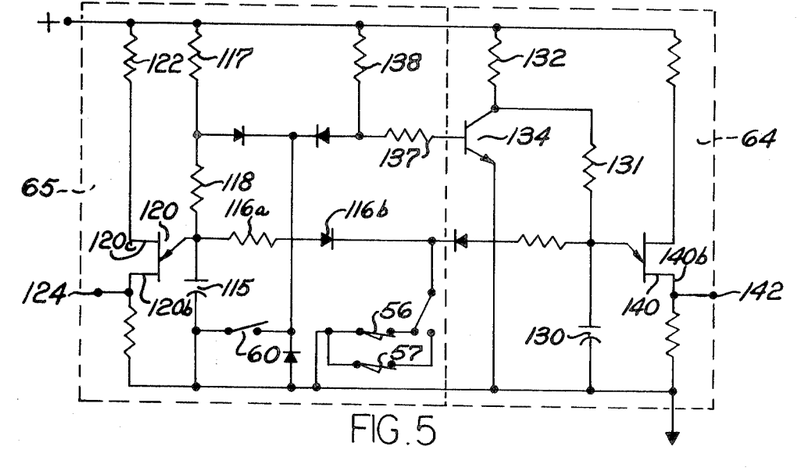
FIGS 5 and 6 are detailed views of components used in the circuit OF FIG. 4.

Referring to FIG. 5, the reset circuit 65 for setting the memory 66 to its $\overline{Q}$-state to indicate a good book when the detector switch 60 or 62 is open comprises a condenser 115 which is normally maintained in a discharged condition by the timing switch 56 or the timing switch 57, as the case may be. The timing switches are normally closed and the selected switch normally completes a circuit across the condenser 115 through a resistor 116a and a diode 116b to prevent the condenser from charging. This inhibits the reset circuit from operating. When the selected timing switch is open, the condenser 115 may charge from the positive side of a power supply through a resistor 117 and a resistor 118 provided the detector switch 60 is open. The resistor 117, 118 and a condenser 115 are connected in series across the power supply with the condenser 115 having one side connected to ground and the other side connected to the resistor 188. To charge the condenser, the detecting switch 60 must be open. If closed, the detecting switch completes a circuit around the resistor 118 and the condenser 115 to ground so that the condenser is effectively short circuited. If, however, the switch is open, as in the case of a book which is good, the condenser will charge until it reaches a voltage such that a unijunction transistor 120 having its emitter 120a connected to a junction between the resistor 118 and the condenser 115 conducts. The unijunction transistor 120 has its base 2 electrode 120c connected to the positive side of the power supply through a resistor 122 and its base 1 electrode 120b connected to ground through a load resistor 123.

An output for the reset circuit is taken from the base electrode 120b and when the unijunction transistor 120 conducts, the condenser 115 will discharge through the unijunction transistor 120 to provide a pulse at the output terminal 124. Consequently, it will be seen that as long as the detector switch 60 and the selected timing switch are open, the condenser 115 will charge until it reaches the peak-point emitter voltage for the unijunction transistor. At this point the transistor conducts to discharge the condenser and the unijunction transistor will cease conducting. The charging and discharging cycle will then be repeated to provide a plurality of pulses at the output terminal 124 as long as the switches remain open.

In a preferred embodiment, the charging time of the condenser 115 is related to the minimum time period for the sensing period at the maximum speed of operation of the machine. For a maximum speed the switches will be open for a minimum time period to allow sensing by the detecting switch 60. The circuit constants are selected so that the condenser 115 will normally require a substantial portion of this period to charge if the detecting switch is basically open but the time for charging is such that it will occur even though there is a stuttering of the contacts during the charging period. Advantageously, the condenser 115 will charge at a rate that will provide a plurality of reset pulses during the sensing period when the book is a good book. This assures the resetting of the memory circuit 66. Since it is necessary to charge the condenser 115 to provide a reset signal, a momentary opening or stuttering of the detecting switch during a sensing period when the switch is detecting a bad book and would normally be closed, will not effect a sufficient charging to produce output pulses on the terminal 124.

At the end of the sensing period, the selected timing switch will close not only to inhibit the reset circuit, but also to discharge the condenser 115 and maintain it in a discharged condition during the nonsensing period, even though there is stuttering at the switch 60.

When a bad book is detected, the detecting switch 60 will be basically closed during the sensing period. This will not produce pulses on output terminal 124 because the condenser 115 will not be charged when detector switch 60 is closed. When true even though the switch 60 is momentarily opened because this is insufficient to charge the condenser 115.

However, with the inspection switch 60 closed, and the selected timing switch 56 or 57 open, a condenser 130 will start to charge. The condenser 130 is connected to the positive side of the power supply through resistors 131, 132 connected in series with the resistor 131 being connected to the condenser. The other side of the condenser 130 is connected to ground. The condenser 130 is normally prevented from charging by a NPN-transistor 134 having its collector and emitter electrodes connected across the resistor 131 and the condenser 130. The base of the transistor 134 is normally connected to the power supply through resistors 137 and 138, the resistor 138 being connected to the transistor base. A base current normally flows through the resistors 137, 138 to maintain the transistor 134 conductive which prevents the condenser 130 from charging. However, if the detector switch 60 is closed when the selected timing switch 56 or 57 is open, a junction between the resistors 137, 138 is connected to ground through the detector switch to render the transistor 134 nonconductive. This will raise the collector potential of the transistor so that the condenser 130 will charge until the potential of the junction between the condenser 130 and the resistor 131 reaches the peak-point emitter of unijunction transistor 140. The unijunction transistor 140 has its emitter connected to the junction between the condenser 130 and the resistor 131 and its base electrodes connected across the power supply with the base 1 electrode 140, 140b connected to ground through a load resistor 141. An output terminal 142 is connected to the base 1 electrode 140b of the unijunction transistor 140 so that when the unijunction transistor conducts, a pulse will appear on the output terminal 142. The conduction of the unijunction transistor will discharge the condenser 130 but as soon as the unijuncton transistor extinguishes, the condenser 130 will again start charging. The charging time of the condenser 130 is related to the minimum time period available during the sensing period in such a manner that the condenser 130 will charge over a substantial portion of the sensing period and preferably that it will charge a plurality of times to provide a plurality of pulses at the output terminal 142 but yet the charging time is such that if the detector switch 60 only closes momentarily, as they might when detecting a good book, a false output signal is not applied to the terminal 142.

The selected timing switch 56a, 57 which is open during the sensing period, closes at the end of the sensing period to connect a relatively small resistor 148 across the condenser 130 so that the condenser cannot charge to a voltage sufficiently high to cause the unijunction transistor to become conductive.

From the foregoing, it can be seen that when the inspection or detector switch 60 is closed during the sensing period, the set circuit 64 is operative to provide pulses at the output terminal 142 which is connected to the set input 66a of the memory circuit 66. The charging of the condenser 130, while requiring a closing of the switch for an appreciable portion of the sensing period is such that the condenser will normally charge and discharge several times during the sensing period to provide a plurality of pulses to the set terminal 66a to assure a setting of the memory circuit.

Similarly, if the detector switch 60 is open during the sensing period, the reset circuit 65 will provide a plurality of pulses which are applied to the reset terminal 66b to reset the memory circuit 66.

The memory circuits 91, 92, and 93 require a clock signal which is a positive going signal followed by a negative going signal to effect a setting of the memory circuit in accordance with the input applied to the set or reset terminal. FIG. 4 illustrates a circuit which is advantageously used to provide the clock signal. Referring to FIG. 4, a timing switch 150 is opened at a time in the machine cycle when a shift pulse is to be applied to the shift register. In the illustrated embodiment, the switch 150 is operated at 220° of the machine cycle for effecting a shifting of the information in the shift register. The switch 150 is normally closed and is opened at the time that the shift is to be effective to allow the condenser 152 to charge. When the switch 150 is closed, it prevents the charging of the condenser 152 by completing a circuit across the condenser 152 through a relatively small resistor 153. The switch 152 is open and the condenser 152 will charge. The charging of the condenser 152 is through a resistor 154 and when the charge on the condenser reaches a predetermined level, it operates a bistable memory circuit 156 to a set condition. The high potential side of the condenser 152 is connected through a diode 157 and a condenser 158 to the set input 156a of the memory circuit 156. When the memory circuit 156 is set, an output appears on its set output terminal 156c, the set output terminal being connected through a condenser 160 to the clock inputs of the memory circuit 91, 92 and 93 in the shift register.

When an output voltage appears on the set output 156c of the memory circuit 156, this voltage is differentiated by the condenser 160 so that a positive going pulse is applied to the clock terminals of the shift register stages.

An output on the output terminal 156c of the memory circuit 156 also causes a reset signal to be applied to the reset terminal 156b of the memory circuit 156 to immediately reset the memory circuit. When the memory circuit resets a negative going signal is applied to the clock terminals of the circuits 91, 92 and 93 because of the differentiation effect produced by the condenser 160.

The resetting signal for the memory circuit 156c is obtained by causing a condenser 164 to charge when an output signal is on the set output 156c. When the condenser charges to the peak-emitter point voltage of a unijunction transistor 166, the transistor becomes conductive to establish a current flow to ground through a resistor 168. The junction of the base 1 electrode 166b of the unijunction transistor is raised by reason of the current flow through the resistor 168 and this base electrode is connected to the reset input 156b of the memory circuit 156 to effect a resetting of the latter on this rise in voltage. When this occurs, a negative going pulse is applied to the shift line 196.

The condenser 164 does not charge when the voltage on the output 156c of the memory 156 is a 0 since the condenser is connected to the output 156c through a resistor 170 and a diode 172. Consequently, when the memory circuit 156 is reset, the signal on the reset terminal 156b is a 0.

The condenser 164 is connected to a 15-volt power supply though a resistor 173. This power supply does not charge the condenser 164 to render transistor 166 conductive when the set output 156c has a 0 thereon since the resistor 170 connecting the condenser to the set output terminal 156c is a relatively small resistor and the voltage on the set output terminal is approximately ground. Therefore, there is only a small voltage drop across the resistor 170 and the diode 172 which is insufficient to establish a charge on the condenser 164 capable of rendering the transistor 166 conductive. However, when the set output 156c of the memory circuit 156 has a 1 thereon, the diode 172 is back biased and the condenser 164 charges to a voltage which will cause the unijunction transistor 166 to conduct and provide a current through the resistor 168 which applies to the reset signal to the input 156b of the memory circuit 156.

It will be noted that since the signal applied to the set terminal 156a of the memory circuit 156 is applied through the condenser 158, the set signal will be applied only once for each closing of the timing switch 150, or immediately thereafter. The signal for setting the memory 156 must be a pulse signal and once the condenser 158 is charged, the condenser 158 must be discharged and again charged to set the circuit 156. If the timing switch 150 closes momentarily while charging the condenser, it will not effect a discharge of the condenser 158 to set up a false signal condition because of the diode 157. Accordingly, the limit switch 150 can only be effective to set the memory circuit 156 a single time until the condenser 158 is discharged by other circuitry.

Once the timing switch has been opened to charge the condenser 158, the condenser circuit 158 is discharged only after the timing switch 150 has been closed and a sufficient time has elapsed to assure that the switch is in a static condition so that a false set signal cannot be applied to the memory circuit 156. The condenser 158 is discharged by closing a timing switch 180 at a subsequent point in the machine cycle, for example 310°, to connect the positive side of the condenser 158 to ground through a diode 181, a resistor 182, a resistor 183 and the timing switch 180. The other side of the condenser 158, that is the side connected to the set terminal 156a, is connected to ground through a high resistance resistor 185. Consequently, when the switch 180 is closed, the condenser 158 discharged so that the opening of the switch 150 during the next cycle will again apply an input signal to the set terminal 156a of the memory circuit 156.

The closing of the timing switch 180 also effects, in the illustrated embodiment, the transfer of information from the memory circuit 66 into the memory circuit 81. A relay coil 186 is connected between the positive terminal of a 15-volt power supply and ground through the resistor 183 and the timing switch 180. Consequently, when the timing switch 180 is closed, the relay coil 186 is energized to close the contacts 80, 85 in the connections between the set and reset outputs of the memory circuit 66 and the direct set and the direct reset inputs of the memory 81.

On starting, a reset pulse is applied to the memory circuits 66, 81, 91 and 93. This reset pulse is obtained from the collector electrode 190 of a transistor 191. The transistor 191 is an NPN-transistor having its emitter connected to ground and its base connected to the positive terminal of the 15-volt source through a resistor 193 and a condenser 194. When power is initially applied to establish the voltage at the terminal for the 15-volt source, current flows through the base circuit of the NPN-transistor 191 to render the transistor conductive. This applies a 0 to the reset terminals of the memory circuits 66, 81, 91, 92 and 93 because of the drop in the collector voltage transistor 191. This effects a resetting of the circuits. When the condenser 194 charges, the current through the transistor 190 stops and the voltage applied to the direct reset terminals is 15 volts, which is the collector voltage of the transistor 191.

Figure 6:
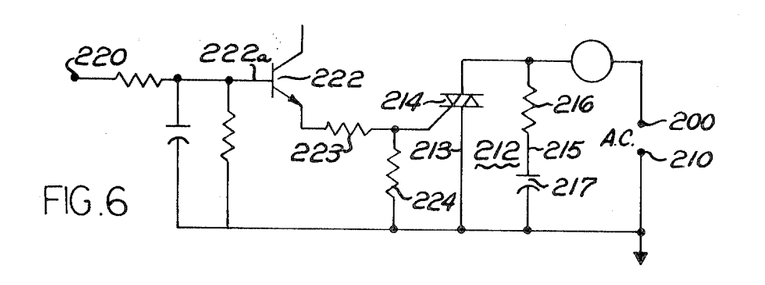

In the foregoing description, switching circuits 101, 111 and 87 for controlling the operation of the reject solenoid, the main contactor, and the stitcher solenoid have been referred to in a general manner. These circuits are shown in FIG. 6. Referring to FIG. 6, an AC voltage is applied to terminals 200 and 210. The load, that is the reject solenoid or the main contactor or the stitcher solenoid, as the case may be, has one side connected to the terminal 200 and its other side to the terminal 210 through a parallel circuit 21. The parallel circuit includes one branch 213 in which a back-to-back SCR 214 is connected and a second branch 215 comprises a series connected resistor 216 and condenser 217. If the back-to-back SCR is not conductive, the impedance of the branch 215 is such that the current through the load is not sufficient to actuate the solenoids involved. If, however, the back-to-back SCR is rendered conductive, the current through the load is sufficient to actuate the stitcher solenoid, the main contactor, or the reject solenoid 34, as the case may be.

The back-to-back SCR is rendered conductive in each cycle by a positive input on an input terminal 220. The terminal 220 is connected to the base 222a of a transistor 222 of the NPN-type to render the transistor conductive to establish current in a gate circuit, including resistor 223 and the gate electrode of the back-to-back SCR 214, for rendering the SCR 214 conductive. The gate electrode of the SCR 214 is connected to ground through a biasing resistor 224. If the input to the terminal 220 is a 0, for example 0.2 volts, the transistor 222 is rendered nonconductive which in turns removes the gate signal from the SCR 214. When the gate signal is removed, the SCR will cease to conduct at the end of the half cycle thereacross.

Referring to FIG. 4, it will be seen that the main contactor is maintained energized unless three bad books cause the memory circuits 81, 91 and 93 to switch to their Q-state so that a 1 input is lost to the switching circuit 111. When the 1 input is lost, the SCR 214 of the switching circuit 111 ceases to conduct and the main contactor is deenergized, stopping the machine. Similarly, if the memory circuit 81 loses its $\overline{Q}$-output, a 1 signal is lost to the switching circuit 87 to deenergize the stitcher solenoid. When the stitcher solenoid is deenergized, it prevents the stitcher from operating.

The reject solenoid 34 is normally nonenergized since the switching circuit 101 normally has a 0 applied to its terminal 220. However, in the event of a bad book, as indicated by a set output on either the memory circuit 92 or the memory circuit 93, depending upon the length of the signature being handled, a 1 will be applied to the terminal 220 to energize the reject solenoid 34 to reject the bad signature book.

The back-to-back SCR 214 is a silicon controlled rectifier which is sometimes known as a triac.

Figure 7:
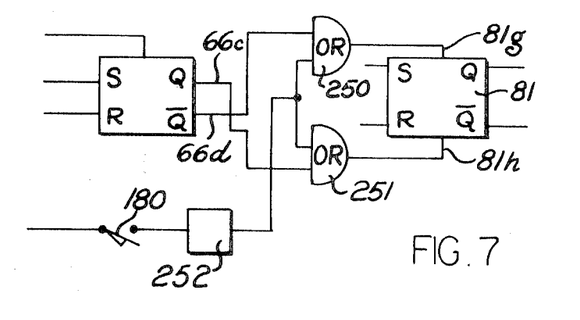
FIG. 7 is a partial circuit showing a modification.

The contacts 80, 85 and magnetic solenoid 186 for setting the memory circuit 81 may be replaced by a static gating circuitry. Such circuitry is shown in FIG. 7. Referring to FIG. 7, the timing switch 180 supplies an input to OR-gate 250 and to OR-gate 251 through an inverter 252. The OR-gate 250 has a second input from the $\overline{Q}$-output 66d of the memory circuit 66 and an output connected to the direct set terminal 81g of the memory circuit 81. The input from the inverter will maintain a 1 on the direct set terminal until switch 180 is closed at the time in the cycle for information from memory circuit 66 to the memory circuit 81. At that time the inverter will have a 0 output to effect a direct set unless the $\overline{Q}$-output of memory circuit 66 is a 1. If a 1 output is present on terminal 66d, the OR gate output will be 1 and no setting of memory circuit 81 will occur. If, however, the output on terminal 66d is 0, a setting will occur.

Similarly OR-gate 251 has a second input connected to the Q-output 66c of the memory 66 and an output connected to the direct reset terminal 81h of the memory circuit 81.

It will be appreciated by those skilled in the art that the timing for transferring information between the memory circuit 66 and memory circuit 81 is not necessary if the stitcher operates in a machine cycle in advance of the sensing of a signature book by the detector wheel. In such a case the stitcher would not operate again until the sensed book is in stitching position.

The above control circuitry and circuits are useful in machines other than signature collators and stitchers. However, they do solve problems involved in such collators and stitchers.

What is claimed is:

1. A machine for handling an article comprising sensing means for sensing a condition of the article comprising switch means operable between first and second states in accordance with the condition sensed, integrating means rendered effective when said switch means is in one state to integrate a signal and provide a first output signal when the integrated signal reaches a predetermined magnitude indicating that the article has a condition to be controlled, and control means responsive to the integrated output signal for performing a control operation, said integrating means comprising a first condenser, first circuit means connecting said first condenser to said switch means to effect charging of said first condenser when said switch means is in said first state, a second condenser, a second circuit means connecting said second condenser to said switch means to effect a charging of said second condenser when said means is in said second state, and a memory circuit to be set in accordance with said condition and having two input terminals, and third and fourth means responsive to the charges on said first and second condensers respectively for applying signals to respective ones of said input terminals to actuate the memory circuit; and said control means being responsive to the condition of said memory circuit.

2. In a machine as defined in claim 1 wherein said first and second circuit means and said condensers are interconnected to constitute relaxation oscillator means for providing pluralities of pulses for actuating said memory circuit.

3. A machine control circuit as defined in claim 1 in which said first and second circuit means have time rates for charging the respective one of said condensers such that a substantial portion of said charging period is required to charge the respective condensers to said predetermined charge with said machine operating at its maximum speed.

4. A machine control circuit as defined in claim 1 wherein said control means comprises a shift register having a first stage set in accordance with the condition of said memory circuit at a predetermined point in the machine cycle and a plurality of additional stages which are set in accordance with the preceding stage upon an application of a clock pulse, said control means further comprising means for applying a clock pulse to said shift register.

5. A machine control circuit as defined in claim 4 wherein said means for applying a cook pulse comprises a switch actuated between open and closed conditions during a machine cycle, a third condenser, circuit means connecting said third condenser and said switch to charge said third condition when said switch is in one of said conditions, means for discharging said third condenser after said switch has been actuated to its other condition after having a charged said condenser, and means responsive to the charging of said condenser to provide said clock pulse.

6. In a machine as defined in claim 5 wherein said first and second circuit means and said condensers are interconnected to constitute relaxation oscillator means for providing pluralities of pulses for actuating said memory circuit.

7. A machine control circuit as defined in claim 5 in which said first and second circuit means have time rates for charging the respective one of said condensers such that a substantial portion of said charging period is required to charge the respective condensers to said predetermined charge with said machine operating at its maximum speed.

8. In a machine as defined in claim 1 and further including means for rendering said first and second circuit means effective for charging said condensers during a charging portion of the machine cycle and for discharging the condensers after each such charging portion.

9. A machine control circuit as defined in claim 1 in which said first and second circuit means have time rates for charging the respective one of said condensers such that a substantial portion of said charging period is required to charge the respective condensers to said predetermined charge with said machine operating at its maximum speed, said substantial portion being less than half of said charging portion with said machine operating at maximum speed and said first and second condensers being connected into a respective third and fourth circuit means to provide relaxation oscillator means.

10. A machine for handling a pack of superimposed sheets comprising sensing means for sensing the thickness of a pack of sheets and operable between first and second states in accordance with the condition sensed, integrating means rendered effective when said switch means is in one state to integrate a signal and provide a first output signal when the integrated signal reaches a predetermined magnitude indicating that the article has a condition to be controlled, and control means responsive to the integrated output signal for performing a control operation, said control means comprising a memory circuit set in the same cycle as the sensing of the thickness of a pack, said memory circuit being set in response to the integrated signal of said predetermined magnitude, first means responsive to the condition of said memory circuit to control a first operation of said machine during a machine cycle subsequent to the cycle of sensing, and means additionally responsive to said memory circuit to perform an additional control operation in a machine cycle after said subsequent cycle, said first means comprising an electrical device to be energized, a condenser connected in series with said electrical device across said AC terminals, a triac connected across said condenser having a gate electrode for rendering said triac conductive when a signal is applied thereto, and switching means responsive to the output of said memory circuit to apply a control signal to said gate electrode indicating the condition of said memory circuit.

11. A machine for handling a pack of superimposed sheets comprising sensing means for sensing the thickness of a pack of sheets and operable between first and second states in accordance with the condition sensed, integrating means rendered effective when said switch means is in one state to integrate a signal and provide a first output signal when the integrated signal reaches a predetermined magnitude indicating that the article has a condition to be controlled, and control means responsive to the integrated output signal for performing a control operation, said control means comprising a memory circuit set in the same cycle as the sensing of the thickness of a pack, said memory circuit being set in response to the integrated signal of said predetermined magnitude, first means responsive to the condition of said memory circuit to control a first operation of said machine during a machine cycle subsequent to the cycle of sensing, and means additionally responsive to said memory circuit to perform an additional control operation in a machine cycle after said subsequent cycle, said pack being a signature book to be stitched and delivered to a delivery mechanism and said first operation being s stitching operation and said additional control operation being a reject operation.

12. A machine for handling an article comprising sensing means for sensing a condition of the article comprising switch means operable between first and second states in accordance with the condition sensed and providing a sensing signal for a portion of a machine cycle when in said one state, integrating means rendered effective when said switch means is in said one state to integrate said sensing signal for a substantial part of said portion and providing a first output signal when the integrated sensing signal reaches a predetermined magnitude indicating that the article has a condition to be controlled, and control means responsive to the integrated output signal for performing a control operation comprising an additional circuit actuated by said first output signal.

13. A machine as defined in claim 12 wherein said article being handled is a pack of superimposed sheets and said sensing means comprises means for sensing the thickness of a pack of sheets and said control means includes means responsive to said additional circuit means for performing a control operation in a cycle subsequent to the cycle in which said additional circuit is actuated by said first output signal.

14. A machine as defined in claim 13 wherein said integrating means comprises a memory circuit set in the same cycle as the sensing of the thickness of a pack to provide said first output signal, and said control means comprising first means responsive to the condition of said memory circuit to control a first operation of said machine during a machine cycle subsequent to the cycle of sensing and means additionally responsive to said memory circuit to perform an additional control operation in a machine cycle after said subsequent cycle.

15. A machine as defined in claim 12 wherein said additional circuit comprises a memory circuit set to a predetermined condition in response to said first output signal and said control means comprises a shift register having a first stage and a plurality of additional stages which are set in accordance with the preceding stage upon the application of a clock pulse, means for setting said first stage in accordance with the condition of said additional circuit at a predetermined point in the machine cycle, said control means further comprising means for applying clock pulses to said shift register in timed relationship to the machine cycle and means responsive to said shift register to perform a control operation subsequent to the cycle in which the first stage of said register is set.

16. A machine as defined in claim 15 wherein said control means includes means responsive to the condition of a plurality of stages of said shift register to stop the operation of the machine.

17. A machine for handling an article comprising sensing means for sensing a condition of the article and storing information concerning said condition in response to said sensing for indicating a control operation to be performed in a subsequent machine cycle comprising a shift register having a plurality of stages, means connected to said sensing means for entering said information into the first stage of said shift register, said shift register having a shift input to which a pulse signal is to be supplied to shift the information stored in one stage of the register to the following stage, circuit means for providing said pulse signal comprising a first switch means periodically actuated between open and closed condition during the machining cycle, a condenser, means for discharging said condenser comprising second switch means actuated when said first switch means is in the other of its conditions to effect a discharge of said condenser, and clock pulse means responsive to a predetermined change in charge in said condenser to provide a pulse for actuating said shift register.

18. A machine as defined in claim 17 wherein said clock pulse means comprises a two stage memory circuit actuatable to one state under the control of said condenser to provide a predetermined output and to a reset state in response to said predetermined output.

* * * * *